Patented Apr. 28, 1931

1,803,182

UNITED STATES PATENT OFFICE

HEINRICH GREUNE, OF HOCHST-ON-THE-MAIN, GERMANY, ASSIGNOR TO GENERAL ANILINE WORKS, INC., OF NEW YORK, N. Y., A CORPORATION OF DELAWARE

PROCESS FOR PREPARING NAPHTHALENE-1.4.5.8-TETRACARBOXYLIC ACID

No Drawing. Application filed July 5, 1927, Serial No. 203,670, and in Germany July 9, 1926.

I have found that naphthalene-1.4.5.8-tetracarboxylic acid of the following formula:

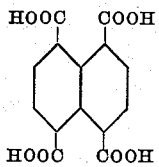

is obtained with a good yield by oxidizing in an appropriate manner the compounds of the probable general formula:

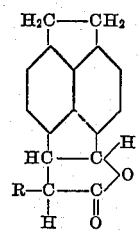

wherein R represents a substituent selected from the class comprising hydrogen, halogen, hydroxyl, and a cyano group. These compounds are obtainable from acenaphthene and a dicarboxylic anhydride derived from maleic anhydride by opening up the double bond by the addition of an additive molecule according to the process described in my copending U. S. application Ser. No. 203,669, filed on July 5, 1927. The oxidation can be effected in an acid or alkaline medium by means of bichromate or permanganate.

The following examples serve to illustrate my invention, but they are not intended to limit it thereto:

(1) 5 parts by weight of the condensation product of the probable formula:

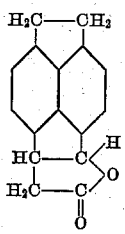

melting at 180° C. obtainable from acenaphthene and succinic anhydride, are dissolved in 100 parts by volume of glacial acetic acid, and to this solution are added by portions at 80° C. 50 parts by weight of finely powdered sodium bichromate, care being taken that the temperature does not exceed 90° C. at the beginning. Only after all of the bichromate has been introduced, the whole is further heated for some hours to boiling in a reflux apparatus, then poured into about 800 parts by volume of cold dilute sulfuric acid and after having allowed the mass to stand in the cold for some time, the resulting precipitate which has partly a granular form and a somewhat yellowish appearance, is filtered by suction. In order to purify it, it is dissolved in a dilute alkali, heated for a short time on the water bath with a small quantity of potassium permanganate, and after elimination of the excess of the oxidizing agent, the alkaline filtrate is acidified with a dilute acid. There is immediately separated a body in the form of colorless needles the properties of which are entirely identical with those of the naphthalene-1.4.5.8-tetracarboxylic acid described by Bamberger and Philip in "Liebigs Annalender Chemie" volume 240, page 182.

(2) 25 parts by weight of the condensation product of the probable formula:

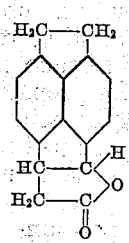

of the melting point 180° C. obtainable from acenaphthene and succinic anhydride, are dissolved in 100 parts by volume of cold, concentrated sulfuric acid, the solution so prepared is poured into 900 parts of ice-water, heated to 80° C. to 90° C. and to this solution is added at the said temperature by portions a solution of 250 parts by weight of sodium bichromate in about 200 parts of water. The mixture begins to froth strongly whereupon the reaction soon abates. The mass is maintained for some hours at a temperature of 80° C. to 90° C., then diluted with some water, filtered by suction and the residue is washed with water. In order to purify the produce it is treated in the manner indicated in example 1; on acidifying the alkaline filtrate, preferably after having it again decolorized by means of animal charcoal, the 1.4.5.8-naphthalenetetracarboxylic acid is obtained in the form of almost colorless needles.

I claim:

1. The process for preparing naphthalene-1.4.5.8-tetracarboxylic acid which comprises causing an oxidizing agent to act upon a compound of the probable formula:

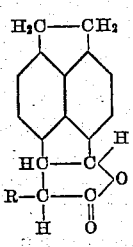

wherein R represents a substituent selected from the group consisting of hydrogen, halogen, hydroxyl and a cyano group.

2. The process for preparing naphthalene-1.4.5.8-tetracarboxylic acid which comprises causing sodium bichromate to act upon a compound of the following formula:

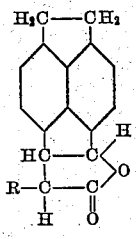

wherein R represents a substituent selected from the group consisting of hydrogen, halogen, hydroxyl, and a cyano group.

3. The process for preparing naphthalene-1.4.5.8-tetracarboxylic acid which comprises causing an oxidizing agent to act upon a compound of the probable formula:

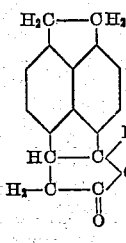

4. The process for preparing naphthalene-1.4.5.8-tetracarboxylic acid which comprises causing sodium bichromate to act upon a compound of the probable formula:

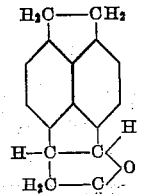

In testimony whereof, I affix my signature.

HEINRICH GREUNE.